3,209,013
OXETANE RING CONTAINING PHOSPHITES
Ingenuin Hechenbleikner and Kenneth R. Molt, Cincinnati, Ohio, assignors to Carlisle Chemical Works, Inc., Reading, Ohio, a corporation of Ohio
No Drawing. Filed Sept. 14, 1961, Ser. No. 137,997
14 Claims. (Cl. 260—333)

This invention relates to novel phosphorus compounds and their use as stabilizers.

An object of the present invention is to prepare phosphorus containing compounds having a four membered oxygen containing heterocyclic ring in their molecule.

Another object is to prepare phosphites containing at least one oxetane ring.

A further object is to extend the heat and light stability of halogen containing resins.

Another object is to prepare fire-resistant polymers.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by preparing compounds of the formulae (1)

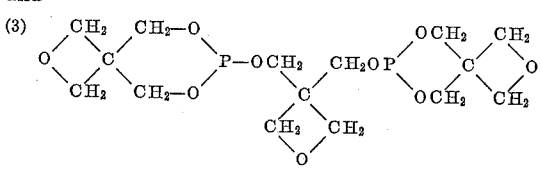

(2)

(3)

where $n$ is selected from the group consisting of 0 and 1, $R_1$ is selected from the group consisting of alkyl, aryl, aralkyl, halomethyl, cyanomethyl, alkoxymethyl, aryloxymethyl, aralkyloxymethyl or acyloxymethyl, $R_2$ and $R_3$ are

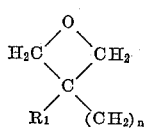

or alkyl, aryl, aralkyl, haloaryl, and $R_4$ is alkyl, aryl, aralkyl, haloaryl or

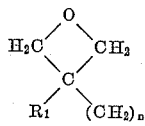

Preferably, $n$ is 1. Preferably, in Formula 1 all three ester groupings attached to the phosphorus atom are the same. $R_1$ is preferably lower alkyl or halo lower alkyl.

Examples of compounds within the present invention are tris (2,2-dimethylene oxide butyl) phosphite,
bis (2,2-dimethylene oxide butyl) phenyl phopshite,
2,2-dimethylene oxide butyl bis (phenyl) phosphite,
bis (2,2-dimethylene oxide butyl) decyl phosphite,
bis (2,2-dimethylene oxide butyl) p-tolyl phosphite,
2,2-dimethylene oxide butyl bis (o-chlorophenyl) phosphite,
bis (2,2-dimethylene oxide butyl) p-chlorophenyl phosphite,
bis (2,2-dimethylene oxide butyl) benzyl phosphite,
bis (2,2-dimethylene oxide butyl) octadecyl phosphite,
bis (2,2-dimethylene oxide butyl) methyl phosphite,
bis (2,2-dimethylene oxide butyl) cyclohexyl phosphite,
2,2-dimethylene oxide butyl bis (decyl) phosphite,
tris (2,2-dimethylene oxide propyl) phosphite,
bis (2,2-dimethylene oxide propyl) phenyl phosphite,
2,2-dimethylene oxide propyl bis (phenyl) phosphite,
tris (2,2-dimethylene oxide octadecyl) phosphite,
tris (2,2-dimethylene oxide-2-phenyl ethyl) phosphite,
bis (2,2-dimethylene oxide-2-phenyl ethyl) phenyl phosphite,
tris (2,2-dimethylene oxide-2-p-tolyl ethyl) phosphite,
tris (2,2-dimethylene oxide-3-phenyl propyl) phosphite,
tris (2,2-dimethylene oxide-3-chloropropyl) phosphite,
bis (2,2-dimethylene oxide-3-chloropropyl) phenyl phosphite,
tris (2,2-dimethylene oxide-3-bromopropyl) phosphite,
tris (2,2-dimethylene oxide3-fluoropropyl) phosphite,
tris (2,2-dimethylene oxide-3-cyanopropyl) phosphite,
tris (2,2-dimethylene oxide-3-methoxy propyl) phosphite,
tris (2,2-dimethylene oxide-3-ethoxy propyl) phosphite,
tris (2,2-dimethylene oxide-3-butoxy propyl) phosphite,
tris (2,2-dimethylene oxide-3-octadecyloxy propyl) phosphite,
tris (2,2-dimethylene oxide-3-phenoxy propyl) phosphite,
tris (2,2-dimethylene oxide-3-p-tolyloxy propyl) phosphite,
tris (2,2-dimethylene oxide-3-benzyloxy propyl) phosphite,
tris (2,2-dimethylene oxide-3-acetyloxy propyl) phosphite,
tris (2,2-dimethylene oxide-3-oleoyloxy propyl) phosphite,
tris (2,2-dimethylene oxide-3-stearoyloxy propyl) phosphite,
tris (2,2-dimethylene oxide-3-abietoyloxy propyl) phosphite,
tris (1,1-dimethylene oxide ethyl) phosphite,
bis (1,1-dimethylene oxide ethyl) phosphite,
tris (1,1-dimethylene oxide propyl) phosphite,
2 - phenoxy - 5,5-dimethylene oxide-1,3,2-dioxaphosphorinane

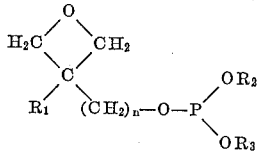

2-p-tolyloxy-5,5-dimethylene oxide-1,3,2-dioxaphosphorinane,
2-p-chlorophenoxy-5,5-dimethylene oxide-1,3-2-dioxaphosphorinane,
2-decyloxy-5,5-dimethylene oxide-1,3,2-dioxaphosphorinane,
2-methyloxy-5,5-dimethylene oxide-1,3,2-dioxaphosphorinane,
2-octadecyloxy-5,5-dimethylene oxide-1,3,2-dioxaphosphorinane,
2-benzyloxy-5,5-dimethylene oxide-1,3,2-dioxaphosphorinane,
2 (2',2'-dimethylene oxide butoxy)-5,5-dimethylene oxide 1,3,2-dioxaphosphorinane, 2 (2',2'-dimethylene oxide propoxy)-5,5-dimethylene oxide-1,3,2-dioxaphosphorinane,
2 (2'-2'-dimethylene oxide-3'-chloropropoxy)-5,5-dimethylene oxide-1,3,2-dioxaphosphorinane,
1,3-bis (5',5'-dimethylene oxide-1,3,2-dioxaphosphorinanoxy)-2-dimethylene oxide propane

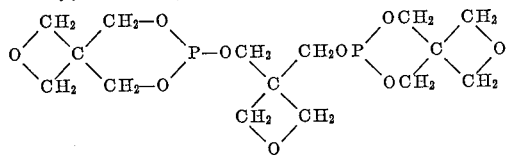

These compounds can be made by reacting the appropriate oxetane with a trialkyl or triaryl or trihaloaryl phosphite in the presence of an alkaline catalyst, e.g., 0.01 to 1% of sodium phenolate, sodium methylate, sodium decylate, sodium cresylate, sodium hydroxide, sodium metal and alcohol, potassium phenolate, etc. The phosphite can be triphenyl phosphite, tri-p-tolyl phosphite, tri-p-chlorophenyl phosphite, tridecyl, phosphite, tricyclohexyl phosphite, trimethyl phosphite, tribenzyl phosphite and diphenyl decyl phosphite. The reaction is carried out by replacing 1, 2 or 3 of the alkyl or aryl groups with the appropriate oxetane ring containing alcohol. If three or more moles of an oxetane ring containing monoalcohol are employed, then a tris oxetane ring containing phosphite is obtained. If two moles of an oxetane ring containing monoalcohol are employed, then a bis oxetane ring containing phosphite is obtained, and if only one mole of an oxetane ring containing monoalcohol is employed, the phosphite formed will contain only one such esterifying group. In the reaction the phenol or alkanol formed is removed by distillation under vacuum. The product formed depends upon whether 1, 2 or 3 moles of phenol or alkanol are removed by distillation.

The compounds of Formula 2 supra are formed by reacting one mole of 3,3-bis-hydroxy-methyl oxetane with one mole of a triaryl or trialkyl phosphite or, when $R_4$ contains an oxetane ring, by reacting a compound having Formula 2 where $R_4$ is alkyl or aryl with an oxetane mono-alcohol. This reaction is also carried out with the basic catalysts above identified. The compound of Formula 3 is prepared by reacting two moles of a triaryl or trialkyl or trihaloaryl phosphite with three moles of 3,3-bis-hydroxymethyl oxetane, utilizing the alkaline catalysts set forth above. In all cases the phenol or alkanol formed is removed, preferably by vacuum distillation.

An alternative procedure of preparing the compounds of this invention is to react three moles of the appropriate oxetane containing a single alcohol group with one mole of phosphorus trichloride in the presence of three moles of pyridine, triethylamine or other tertiary amine as a hydrogen chloride acceptor.

The oxetanes which can be employed as starting materials in addition to 3,3-bis-hydroxymethyl oxetane include 3-ethyl-3-hydroxymethyl oxetane,
3-methyl-3-hydroxymethyl oxetane,
3-hexadecyl-3-hydroxymethyl oxetane,
3-phenyl-3-hydroxymethyl oxetane,
3-p-tolyl-3-hydroxymethyl oxetane,
3-benzyl-3-hydromethyl oxetane,
3-chloromethyl-3-hydroxymethyl oxetane,
3-bromomethyl-3-hydroxymethyl oxetane,
3-fluoromethyl-3-hydroxymethyl oxetane,
3-cyanomethyl-3-hydroxymethyl oxetane,
3-methoxymethyl-3-hydroxymethyl oxetane,
3-ethoxymethyl-3-hydroxymethyl oxetane,
3-butoxymethyl-3-hydroxymethyl oxetane,
3-octadecyloxymethyl-3-hydroxymethyl oxetane,
3-phenoxymethyl-3-hydroxymethyl oxetane,
3-p-tolyloxymethyl-3-hydroxymethyl oxetane,
3-benzyloxymethyl-3-hydroxymethyl oxetane,
3-acetyloxymethyl-3-hydroxymethyl oxetane,
3-oleoyloxymethyl-3-hydroxymethyl oxetane,
3-stearoxyloxymethyl-3-hydroxymethyl oxetane,
3-abietoyloxymethyl-3-hydroxymethyl oxetane,
3-ethyl-3-hydroxy oxetane,
and 3-methyl-3-hydroxy oxetane.

Many of these oxetane compounds are old. Those which are new can be prepared as described in the "Journal of the American Chemical Society," volume 79, page 3455, "Journal of the Chemical Society" (1955), pages 3648–3654, British Patent 723,777, British Patent 758,450, Wyler U.S. Patent 2,495,305, Schilling U.S. Patent 2,794,027, and Schnell U.S. Patent 2,910,483.

The compounds of the present invention are useful to form flameproof oxetane polymers and copolymers. The polymers can be formed into fibers of high molecular weight, can be molded into cups and other articles, etc. The polymers can be prepared as described in the aforementioned British patents by contacting compounds of the present invention with boron fluoride or its complexes. The compounds of the present invention also can be used as crosslinking agents, e.g., when used in an amount of 0.1 to 10% with 3,3-bis (chloromethyl) oxetane.

The compounds of the present invention are particularly valuable as stabilizers for halogen containing resins and, in fact, some of them have been found superior to the best known stabilizers for such purpose. They can be used in an amount of 0.01 to 10%, preferably 0.2 to 5%, by weight of the resin.

The stabilizers of the present invention can be used with halogen containing vinyl and vinylidene resins in which the halogen is attached directly to the carbon atoms. Preferably, the resin is a vinyl halide resin, specifically, a vinyl chloride resin. Usually, the vinyl chloride resin is made from monomers consisting of vinyl chloride alone or a mixture of monomers comprising at least 70% vinyl chloride by weight. When vinyl chloride copolymers are stabilized, preferably the copolymer of vinyl chloride with an ethylenically unsaturated compound copolymerizable therewith contains at least 10% of polymerized vinyl chloride.

As the chlorinated resin there can be employed chlorinated polyethylene having 14 to 75%, e.g., 27%, chlorine by weight, polyvinyl chloride, polyvinylidene chloride, polyvinyl bromide, polyvinyl fluoride, copolymers of vinyl chloride with 1 to 90%, preferably 1 to 30%, of a copolymerizable ethylenically unsaturated material such as vinyl acetate, vinyl butyrate, vinyl benzoate, vinylidene chloride, diethyl fumarate, diethyl maleate, other alkyl fumarates and maleates, vinyl propionate, methyl acrylate, 2-ethylhexyl acrylate, butyl acrylate and other alkyl acrylates, methyl methacrylate, ethyl methacrylate, butyl methacrylate, and other alkyl methacrylates, methyl α-chloroacrylate, styrene, trichloroethylene, vinyl ethers such as vinyl ethyl ether, vinyl chloroethyl ether, and vinyl phenyl ether, vinyl ketones such as vinyl methyl ketone and vinyl phenyl ketone, 1 - fluoro - 1-chloroethylene, acrylonitrile, chloroacrylonitrile, allylidene diacetate and chloroallylidene diacetate. Typical copolymers include vinyl chloride-vinyl acetate (96:4 sold commercially as VYNW), vinyl chloride-vinyl acetate (87:13), vinyl chloride-vinyl acetate-maleic anhydride (86:13:1), vinyl chloride and vinylidene chloride (95:5), vinyl chloride-diethyl fumarate (95:5), vinyl chloride-trichloroethylene (95:5), vinyl chloride-2-ethylhexyl acrylate (80:20).

The stabilizers of the present invention can be incorporated with the resin by admixing in an appropriate mill or mixer or by any of the other well known methods which provide for uniform distribution throughout the resin composition. Thus, mixing can be accomplished by milling on rolls at 100–160° C.

In addition to the novel stabilizers there can also be incorporated with the resin conventional additives such as plasticizers, pigments, fillers, dyes, ultra-violet light absorbing agents, densifying agents and the like.

If a plastizer is employed, it is used in conventional amounts, e.g., 30–150 parts per 100 parts of resin. Typical plasticizers are di-2-ethylhexyl phthalate, dibutyl sebacate, dioctyl sebacate and tricresyl phosphate.

Conventional additives such as barium and cadmium laurate can also be added.

Unless otherwise indicated, all parts and percentages are by weight.

*Example 1*

155.1 grams (0.5 mole) of triphenyl phosphite, 220.4 grams (1.9 moles) of 3-ethyl-3-hydroxy-methyl oxetane and 0.5 gram of sodium methylate were heated for 2 hours at a temperature from 130 to 160° C. at 15 mm. Hg. Phenol was removed from the reaction mixture through an 18″ column at a head temperature of 78 to 79° C. at 15 mm. The excess oxetane was removed at 0.2 mm. Hg by heating to 160° C. After cooling, the product was filtered. The yield of tris (2,2-dimethylene oxide butyl) phosphite was 171 grams (91% of theory) as a nearly colorless liquid $n_D^{20}$ 1.4803. Infrared spectrum analysis showed no P—H, P=O, OH or monosubstituted benzene groups.

*Example 2*

280.0 grams (0.9 mole) of triphenyl phosphite, 208.0 grams (1.8 moles) of 3-ethyl-3-hydroxymethyl oxetane and 0.5 gram of sodium methylate were heated in a vacuum in the manner described in Example 1. The theoretical amount of phenol (169 grams) was obtained in one hour. The product was filtered after stripping at 160° C. at 0.2 mm. Hg. The yield of bis (2,2-dimethylene oxide butyl) phenyl phosphite was 317 grams (99.4% of theory) as a colorless liquid. Infrared spectrum analysis showed no P—H, OH or P=O groups.

*Example 3*

One mole of triphenyl phosphite, one mole of 3-ethyl-3-hydroxymethyl oxetane and 0.5 gram of sodium phenolate were heated in a vacuum in the manner described in Example 1. When the theoretical amount of phenol (94 grams) was obtained, the product was stripped at 160° C., and 0.2 mm. Hg and filtered to yield 1,2-dimethylene oxide butyl bis (phenyl) phosphite as a liquid.

*Example 4*

One mole of tridecyl phosphite, 2 moles of 3-ethyl-3-hydroxymethyl oxetane and 0.5 gram of sodium decylate were heated in a vacuum in the manner described in Example 1. After removal of 2 moles of decyl alcohol, there was recovered bis (2,2-dimethylene oxide butyl) decyl phosphite as the liquid residue.

*Example 5*

One mole of tri p-tolyl phosphite, 2 moles of 3-ethyl-3-hydroxymethyl oxetane and 0.5 gram of sodium methylate were heated in a vacuum in the manner described in Example 1. After removal of 2 moles of p-cresol, there was recovered bis (2,2-dimethylene oxide butyl) p-tolyl phosphite as the liquid residue.

*Example 6*

One mole of tri o-chlorophenyl phosphite, 2 moles of 3-ethyl-3-hydroxymethyl oxetane and 0.5 gram of sodium methylate were heated in a vacuum in the manner described in Example 1. After removal of 2 moles of o-chlorophenol, there was recovered bis (2,2-dimethylene oxide butyl) o-chlorophenyl phosphite as the liquid residue.

*Example 7*

One mole of tribenzyl phosphite, 2 moles of 3-ethyl-3-hydroxymethyl oxetane and 0.5 gram (0.009 mole) of sodium methylate were heated in a vacuum in the manner described in Example 1. After removal of 2 moles of benzyl alcohol, there was recovered bis (2,2-dimethylene oxide butyl) benzyl phosphite as the liquid residue.

*Example 8*

One mole of trimethyl phosphite, 2 moles of 3-ethyl-3-hydroxymethyl oxetane and 0.5 gram of sodium methylate were heated in a vacuum in the manner described in Example 1. After removal of two moles of methyl alcohol, there was recovered bis (2,2-dimethylene oxide butyl) methyl phosphite as the liquid residue.

*Example 9*

One mole of tricyclohexyl phosphite, 2 moles of 3-ethyl-3-hydroxymethyl oxetane and 0.5 gram of sodium methylate were heated in a vacuum in the manner described in Example 1. After removal of two moles of cyclohexyl alcohol, there was recovered bis (2,2-dimethylene oxide butyl) methyl phosphite as the liquid residue.

*Example 10*

One mole of triphenyl phosphite, 3.8 moles of 3-methyl-3-hydroxymethyl oxetane and 0.5 gram of sodium methylate were heated in a vacuum in the manner described in Example 1. After removal of about three moles of phenol, and removal of excess oxetane in the manner set forth in Example 1, there was recovered tris (2,2-dimethylene oxide propyl) phosphite as the liquid residue.

*Example 11*

One mole of triphenyl phosphite, one mole of 3-methyl-3-hydroxymethyl oxetane and 0.5 gram of sodium methylate were heated in a vacuum in the manner described in Example 1. After removal of one mole of phenol, there was recovered 2,2-dimethylene oxide propyl bis (phenyl) phosphite as the liquid residue.

*Example 12*

One mole of triphenyl phosphite, 3 moles of 3-phenyl-3-hydroxymethyl oxetane and 0.5 gram of sodium methylate were heated in a vacuum in the manner described in Example 1. After removal of about 3 moles of phenol, there was recovered tris (2,2-dimethylene oxide-2-phenyl ethyl) phosphite as the liquid residue.

*Example 13*

One mole of triphenyl phosphite, 3.8 moles of 3-p-tolyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-2-p-tolyl ethyl) phosphite as the liquid residue.

*Example 14*

One mole of triphenyl phosphite, 3.8 moles of 3-chloromethyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-3-chloropropyl) phosphite as the liquid residue.

*Example 15*

One mole of triphenyl phosphite, 2 moles of 3-chloromethyl-3-hydroxymethyl oxetane and 0.5 gram of sodium methylate were heated in a vacuum in the manner described in Example 1. After removal of 2 moles of phenol, there was recovered bis (2,2-dimethylene oxide-3-chloropropyl) phenyl phosphite as the liquid residue.

*Example 16*

One mole of triphenyl phosphite, 3.8 moles of 3-bromomethyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-3-bromopropyl) phosphite as the liquid residue.

*Example 17*

One mole of triphenyl phosphite, 3.5 moles of 3-fluoromethyl-3-hydroxymethyl oxetane and 0.5 gram of sodium ethylate were heated in a vacuum in the manner described in Example 1. After removal of about 3 moles of phenol, and removal of the excess oxetane in the manner set forth in Example 1, there was recovered tris (2,2-dimethylene oxide-3-fluoropropyl) phosphite as the liquid residue.

*Example 18*

One mole of triphenyl phosphite, 3.8 moles of 3-cyanomethyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-3-cyanopropyl) phosphite as the liquid residue.

*Example 19*

One mole of triphenyl phosphite, 3.8 moles of 3-methoxy-methyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-3-methoxypropyl) phosphite as the liquid residue.

*Example 20*

One mole of triphenyl phosphite, 3.8 moles of 3-butoxy-methyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-3-butoxypropyl) phosphite as the liquid residue.

*Example 21*

One mole of triphenyl phosphite, 3.8 moles of 3-phenoxymethyl-3-hydroxymethyl oxetane and 0.5 grams of sodium methylate were heated in a vacuum in the manner described in Example 1. After removal of about 3 moles of phenol, and removal of the excess oxetane in the manner set forth in Example 1, there was recovered tris (2,2-dimethylene oxide-3-phenoxypropyl) phosphite as the liquid residue.

*Example 22*

One mole of triphenyl phosphite, 3.8 moles of 3-acetyloxymethyl-3-hydroxymethyl oxetane and 0.5 gram of sodium methylate were heated in a vacuum in the manner described in Example 1. After removal of about 3 moles of phenol and removal of the excess oxetane in the manner set forth in Example 1, there was recovered tris (2,2-dimethylene oxide-3-acetyloxypropyl) phosphite as the liquid residue.

*Example 23*

One mole of triphenyl phosphite, 3.8 moles of 3-oleoyloxymethyl-3-hydroxymethyl oxetane and 0.5 gram of sodium methylate were heated in a vacuum in the manner described in Example 1. After removal of about 3 moles of phenol, and removal of the excess oxetane in the manner set forth in Example 1, there was recovered tris (2,2-dimethylene oxide-3-oleoyloxypropyl) phosphite as the liquid residue.

*Example 24*

One mole of triphenyl phosphite, 3.8 moles of 3-ethyl-3-hydroxy oxetane and 0.5 gram of sodium methylate were heated in a vacuum in the manner described in Example 1. After removal of about 3 moles of phenol, and removal of the excess oxetane in the manner set forth in Example 1, there was recovered tris (1,1-dimethylene oxide propyl) phosphite as a liquid.

*Example 25*

One mole of triphenyl phosphite, 3.8 moles of 3-methyl-3-hydroxy oxetane and 0.5 gram of sodium methylate were heated in a vacuum in the manner described in Example 1. After removal of about 3 moles of phenol, and removal of the excess oxetane in the manner set forth in Example 1, there was recovered tris (1,1-dimethylene oxide ethyl) phosphite as a liquid.

*Example 26*

One mole of triphenyl phosphite, one mole of 3,3-bishydroxymethyl oxetane and 0.5 gram of sodium methylate were heated in a vacuum in the manner described in Example 1. After removal of 2 moles of phenol, there was recovered 2-phenoxy-5,5-dimethylene oxide-1,3,2-dioxaphosphorinane as a liquid.

*Example 27*

One mole of tri p-tolyl phosphite, one mole of 3,3-bishydroxymethyl oxetane and 0.5 gram of sodium methylate were heated in a vacuum in the manner described in Example 1. After removal of 2 moles of cresol, there was recovered 2-p-tolyloxy-5,5-dimethylene oxide-1,3,2-dioxaphosphorinane as a liquid.

*Example 28*

One mole of tri o-chlorophenyl phosphite, one mole of 3,3-bis-hydroxymethyl oxetane and 0.5 gram of sodium methylate were heated in a vacuum in the manner described in Example 1. After removal of 2 moles of o-chlorophenol, there was recovered 2-chlorophenoxy-5,5-dimethylene oxide-1,3,2-dioxaphosphorinane as a liquid.

*Example 29*

One mole of tridecyl phosphite, one mole of 3,3-bishydroxymethyl oxetane and 0.5 gram of sodium methylate were heated in a vacuum in the manner described in Example 1. After removal of 2 moles of decyl alcohol, there was recovered 2-decyloxy-5,5-dimethylene oxide-1,3,2-dioxaphosphorinane as a liquid.

*Example 30*

One mole of trimethyl phosphite, one mole of 3,3-bishydroxymethyl oxetane and 0.5 gram of sodium methylate were heated in a vacuum in the manner described in Example 1. After removal of 2 moles of methyl alcohol, there was recovered 2-methoxy-5,5-dimethylene oxide-1,3,2-dioxaphosphorinane as a liquid.

*Example 31*

One mole of 2-phenoxy-5,5-dimethylene oxide-1,3,2-dioxaphosphorinane prepared as set forth in Example 26, one mole of 3-ethyl-3-hydroxymethyl oxetane and 0.5 gram of sodium methylate were heated in a vacuum in the manner described in Example 1. After removal of one mole of phenol, there was recovered 2 (2′,2′-dimethylene oxide butoxy)-5,5-dimethylene oxide-1,3,2-dioxaphosphorinane as a liquid.

*Example 32*

One mole of 2-phenoxy-5,5-dimethylene oxide-1,3,2-dioxaphosphorinane, one mole of 3-methyl-3-hydroxymethyl oxetane and 0.5 gram of sodium methylate were heated in a vacuum in the manner described in Example 1. After removal of one mole of phenol, there was recovered 2 (2′,2′-dimethylene oxide propoxy)-5,5-dimethylene oxide-1,3,2-dioxaphosphorinane as a liquid.

*Example 33*

One mole of 2-phenoxy-5,5-dimethylene oxide-1,3,2-dioxaphosphorinane, one mole of 3-chloromethyl-3- hydroxymethyl oxetane and 0.5 gram of sodium methylate were heated in a vacuum in the manner described in Example 1. After removal of one mole of phenol, there was recovered 2 (2',2'-dimethylene oxide-3'-chloropropoxy)-5,5-dimethylene oxide - 1,3,2 - dioxaphosphorinane as a liquid.

Example 34

Two moles of triphenyl phosphite, 3 moles of 3,3-bis-hydroxymethyl oxetane and 1 gram of sodium methylate were heated in a vacuum in the manner described in Example 1. After removal of 6 moles of phenol, there was recovered 1,3-bis (5',5'-dimethylene oxide-1,3,2-dioxaphosphorinanoxy)-2,2-dimethylene oxide propane as a liquid.

As previously stated, the new compounds of the present invention have been found to be exceptionally useful as stabilizers for vinyl chloride resins. The stabilizer tests in the following examples were carried out at 360° F. (216° C.) in the conventional forced draft oven. In the examples Geon 103 EP is a vinyl chloride homopolymer manufactured by B. F. Goodrich.

In the folowing examples the formulations contained 100 parts Geon 103 EP, 50 parts dioctyl phthalate, 0.5 part mineral oil, 2 parts of barium-cadmium laurate (BC–12) (except Example 37 which omitted this material) and the indicated parts of phosphite.

Example 35

This was a comparison example and the phosphite employed was 1.67 parts of phenyl didecyl phosphite. This polyvinyl chloride product started to yellow at 105 minutes and was dark at 120 minutes. The formulation of Example 35 is the best known commercial stabilizer composition for polyvinyl chloride.

Example 36

The phosphite employed in the polyvinyl chloride composition was 1.43 parts of tris (2,2-dimethylene oxide butyl) phosphite. The polyvinyl chloride composition started to yellow at 120 minutes and was dark at 165 minutes. Thus, the novel phosphite was a superior stabilizer to the commercial product.

Example 37

Example 36 was repeated omitting the barium-cadmium laurate from the formulation. The phosphite improved the stability of the polyvinyl chloride.

Example 38

The phosphite employed in the polyvinyl chloride composition was 1.5 parts of bis (2,2-dimethylene oxide butyl) phenyl phosphite. The phosphite improved the stability of the polyvinyl chloride.

Example 39

The phosphite employed in the polyvinyl chloride composition was 1.6 parts of 2,2-dimethylene oxide butyl bis (phenyl) phosphite. The phosphite improved the stability of the polyvinyl chloride.

Example 40

The phosphite employed in the polyvinyl chloride composition was 1.6 parts of bis (2,2-dimethylene oxide butyl) decyl phosphite. The phosphite improved the stability of the polyvinyl chloride.

Example 41

The phosphite employed in the polyvinyl chloride composition was 1.2 parts of tris (2,2-dimethylene oxide propyl) phosphite. The phosphite improved the stability of the polyvinyl chloride.

Example 42

The phosphite employed in the polyvinyl chloride composition was 1.6 parts of tris (2,2-dimethylene oxide-2-phenylethyl) phosphite. The phosphite improved the stability of the polyvinyl chloride.

Example 43

The phosphite employed in the polyvinyl chloride composition was 1.5 parts of tris (2,2-dimethylene oxide-3-chloropropyl) phosphite. The phosphite improved the stability of the polyvinyl chloride.

Example 44

The phosphite employed in the polyvinyl chloride composition was 1.5 parts of tris (2,2-dimethylene oxide-3-methoxypropyl) phosphite. The phosphite improved the stability of the polyvinyl chloride.

Example 45

The phosphite employed in the polyvinyl chloride composition was 1.6 parts of tris (2,2-dimethylene oxide-3-acetyloxy propyl) phosphite. The phosphite improved the stability of the polyvinyl chloride.

Example 46

The phosphite employed in the polyvinyl chloride composition was 1.3 parts of tris (1,1-dimethylene oxide propyl) phosphite. The phosphite improved the stability of the polyvinyl chloride.

Example 47

The phosphite employed in the polyvinyl chloride composition was 1 part of 2-phenoxy-5,5-dimethylene oxide-1,3,2-dioxaphosphorinane. The phosphite improved the stability of the polyvinyl chloride.

Example 48

The phosphite employed in the polyvinyl chloride composition was 1.3 parts of 2-decyloxy-5,5-dimethylene oxide-1,3,2-dioxaphosphorinane. The phosphite improved the stability of the polyvinyl chloride.

Example 49

The phosphite employed in the polyvinyl chloride composition was 1.1 parts of 2 (2',2'-dimethylene oxide butoxy)-5,5-dimethylene oxide-1,3,2-dioxaphosphorinane. The phosphite improved the stability of the polyvinyl chloride.

Example 50

The phosphite employed in the polyvinyl chloride composition was 1.1 parts of 2 (2',2'-dimethylene oxide propoxy)-5,5-dimethylene oxide-1,3,2 - dioxaphosphorinane. The phosphite improved the stability of the polyvinyl chloride.

Example 51

The phosphite employed in the polyvinyl chloride composition was 1 part of 1,3-bis (5',5'-dimethylene oxide-1,3,2-dioxaphosphorinanoxy)-2,2-dimethylene oxide propane. The phosphite improved the stability of the polyvinyl chloride.

In addition to barium and cadmium laurates, other conventional additives to vinyl chloride resin compositions can be used in conjunction with the phosphites of the present invention. Thus, there can be used calcium stearate, cadmium octoate, barium octoate, barium octyl phenolate and other known phenolic stabilizers for vinyl chloride resins.

The oxetanes alone or admixed with the other stabilizing materials can be sold as such and can be blended into the halogen containing polymer by the processor or user of the polymer. Alternatively, the polymer manufacturer can blend the stabilizing material into the polymer and sell the stabilized polymer to the processor or ultimate user.

We claim:
1. A compound having a formula selected from the group consisting of

(1) 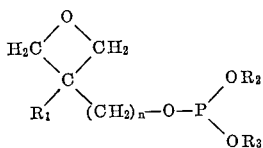

(2) 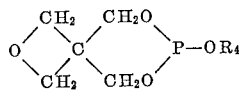

and (3) 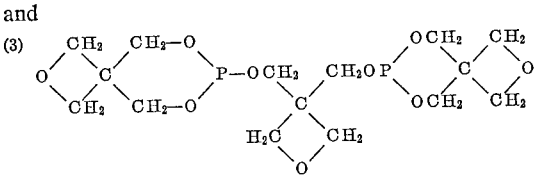

where n is selected from the group consisting of 0 and 1, R₁ is selected from the group consisting of hydrocarbon free of acetylenic unsaturation, halomethyl, cyanomethyl, alkoxymethyl, monocarbocyclic aryloxymethyl, monocarbocyclic aralkyloxymethyl and alkanoyloxymethyl, R₂ and R₃ are selected from the group consisting of

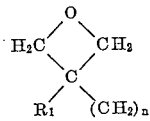

hydrocarbon free of acetylenic unsaturation and halomonocarbocyclic aryl and R₄ is selected from the group consisting of hydrocarbon free of acetylenic unsaturation and halomonocarbocyclic aryl.

2. Tris (2,2-dimethylene oxide alkyl) phosphite wherein the alkyl group has 3 to 4 carbon atoms.
3. Bis (2,2-dimethylene oxide alkyl) monocarbocyclic aryl phosphite wherein the alkyl group has 3 to 4 carbon atoms.
4. Compound according to claim 3 wherein the aryl group is phenyl.
5. 2,2-dimethylene oxide alkyl bis (monocarbocyclic aryl) phosphite wherein the alkyl group has 3 to 4 carbon atoms.
6. Tris (2,2-dimethylene oxide-3 halopropyl) phosphite.
7. Tris (2,2-dimethylene oxide-3 chloropropyl) phosphite.
8. Tris (2,2-dimethylene oxide butyl) phosphite.
9. Tris (2,2-dimethylene oxide propyl) phosphite.
10. 2-monocarbocyclic aryloxy-5,5-dimethylene oxide-1,3,2-dioxaphosphorinane.
11. 2-phenoxy-5,5-dimethylene oxide-1,3,2-dioxaphosphorinane.
12. 2-alkoxy-5,5-dimethylene oxide-1,3,2-dioxaphosphorinane.
13. 2(2',2'-dimethylene oxide alkoxy)-5,5-dimethylene oxide-1,3,2-dioxaphosphorinane.
14. 1,3-bis (5'5,'-dimethylene oxide-1,3,2-dioxaphosphorinanoxy)-2,2-dimethylene oxide propane.

References Cited by the Examiner

UNITED STATES PATENTS

| | | | |
|---|---|---|---|
| 2,594,322 | 4/52 | Leonard | 260—333 |
| 2,770,610 | 11/56 | Hardy et al. | 260—45.8 |
| 2,856,369 | 10/58 | Smith et al. | 260—347.8 |
| 2,913,464 | 11/59 | Moseley | 260—333 |
| 2,997,454 | 8/61 | Leistner et al. | 260—45.8 |
| 3,006,929 | 10/61 | Case et al. | 260—333 |
| 3,041,350 | 6/62 | McConnell et al. | 260—333 X |
| 3,093,660 | 6/63 | Aftandilian et al. | 260—348 X |
| 3,096,345 | 7/63 | Hechenbleikner et al. | 260—340.7 |
| 3,112,280 | 11/63 | Farthing | 260—333 X |
| 3,157,675 | 11/64 | Witt | 260—340.7 |

NICHOLAS S. RIZZO, *Primary Examiner.*

MILTON STERMAN, *Examiner.*